United States Patent
Zhang et al.

(10) Patent No.: US 12,334,494 B2
(45) Date of Patent: Jun. 17, 2025

(54) ELECTROLYTE AND ELECTROCHEMICAL DEVICE

(71) Applicant: Ningde Amperex Technology Limited, Fujian (CN)

(72) Inventors: Lilan Zhang, Ningde (CN); Chao Tang, Ningde (CN); Jianming Zheng, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 18/607,737

(22) Filed: Mar. 18, 2024

(65) Prior Publication Data

US 2024/0243344 A1   Jul. 18, 2024

Related U.S. Application Data

(63) Continuation of application No. 16/970,864, filed as application No. PCT/CN2020/077638 on Mar. 3, 2020, now Pat. No. 11,967,674.

(51) Int. Cl.
*H01M 10/0525* (2010.01)
*H01M 10/0567* (2010.01)
*H01M 10/0569* (2010.01)

(52) U.S. Cl.
CPC ... *H01M 10/0525* (2013.01); *H01M 10/0567* (2013.01); *H01M 10/0569* (2013.01); *H01M 2300/0025* (2013.01)

(58) Field of Classification Search
CPC ......... H01M 10/0525; H01M 10/0567; H01M 10/0569
See application file for complete search history.

(56) References Cited

U.S. PATENT DOCUMENTS

| | | | |
|---|---|---|---|
| 9,812,739 B2* | 11/2017 | Kefei | H01M 10/0567 |
| 2006/0035144 A1 | 2/2006 | Shimizu et al. | |
| 2006/0147803 A1* | 7/2006 | Kim | H01M 4/661 |
| | | | 429/231.95 |

FOREIGN PATENT DOCUMENTS

| | | |
|---|---|---|
| CN | 102171869 A | 8/2011 |
| CN | 102668221 A | 9/2012 |
| CN | 104505535 A | 4/2015 |
| CN | 105057354 A | 11/2015 |
| CN | 107251309 A | 10/2017 |
| CN | 107256980 A | 10/2017 |

(Continued)

OTHER PUBLICATIONS

European Extended Search Report mailed Apr. 24, 2023 in European counterpart application EP20923314.7, 10 pages in English.

(Continued)

*Primary Examiner* — Karie O'Neill Apicella
(74) *Attorney, Agent, or Firm* — Maier & Maier, PLLC

(57) ABSTRACT

An electrochemical device, including a positive electrode, a negative electrode, a separator and an electrolyte. The electrolyte includes a nitrile compound, and the mass percentage of the nitrile compound in the electrolyte is A %; the negative electrode includes a current collector, wherein the current collector includes a first region and a second region; the first region is provided with a negative electrode active substance layer; the second region does not include a negative electrode active substance layer; the area of the second region is B % of the surface area of the current collector; and A×B<600.

19 Claims, 5 Drawing Sheets

(56) References Cited

FOREIGN PATENT DOCUMENTS

| | | |
|---|---|---|
| CN | 109361018 A | 2/2019 |
| CN | 110042439 A | 7/2019 |
| CN | 110739487 A | 1/2020 |
| CN | 111342129 B | 7/2021 |
| JP | 2018156803 A | 10/2018 |
| JP | 2019207755 A | 12/2019 |

OTHER PUBLICATIONS

Chinese First Office Action mailed May 25, 2022 in counterpart Chinese application CN202110727536.3, 8 pages in Chinese.
Chinese First Office Action mailed Feb. 19, 2021 in counterpart Chinese application CN202010140217.8, 9 pages in Chinese.
PCT International Search Report mailed Nov. 25, 2020 in PCT counterpart application PCT/CN2020/077638, 4 pages in Chinese.

\* cited by examiner

ELECTROLYTE AND ELECTROCHEMICAL DEVICE

CROSS REFERENCE TO RELATED APPLICATIONS

The present application is a continuation application of U.S. application Ser. No. 16/970,864, which is a National Stage application of International Application No. PCT/CN2020/077638, filed on Mar. 3, 2020, the contents of which are incorporated herein by reference in its entirety.

TECHNICAL FIELD

The present application relates to the technical field of energy storage, and more particularly to an electrolyte and an electrochemical device including the electrolyte.

BACKGROUND

Electrochemical devices, such as lithium-ion batteries, have the advantages of high energy density, high working voltage, low self-discharging rate, long cycle life, no pollution and the like, and thus have been widely applied to the fields of computers, intelligent wearable devices, smart phones, unmanned aerial vehicles, electric vehicles and the like. With the development of modern information technology and the expansion of the application range of lithium-ion batteries, there are higher requirements on energy density of lithium-ion batteries in the art.

There are many factors affecting the energy density of lithium-ion batteries. At present, improving a charging cut-off voltage of the lithium-ion battery is one of the effective measures for improving the energy density, but the voltage improvement causes deterioration of positive electrode stability. How to solve the above-mentioned problem to increase the energy density of lithium-ion batteries has become an urgent problem to be solved in the art.

SUMMARY

Through research, the inventor discovers that although nitrile additives may effectively improve stability of positive electrode and thus significantly improve properties such as cycle performance of electrochemical devices, the nitrile additives may cause copper dissolution from current collector of negative electrode, thus influencing stability of negative electrode, and particularly, battery self-discharging or even safety problems may occur when copper ions are dissolved at welding position of tab.

The present application provides an electrochemical device capable of meeting high-voltage cycle stability, solving the self-discharging problem of electrochemical devices at high voltage, and improving safety characteristics.

In some embodiments, the present application provides an electrochemical device, including a positive electrode, a negative electrode, a separator and an electrolyte, wherein the electrolyte includes a nitrile compound, and the mass percentage of the nitrile compound in the electrolyte is A %.

The negative electrode includes a current collector, and the current collector includes a first region and a second region;
 the first region is provided with a negative electrode active substance layer;
 the second region does not include a negative electrode active substance layer;
 the area of the second region accounts for B % of the surface area of the current collector; and $A \times B < 600$.

In some embodiments, the nitrile compound includes at least one of the following: a compound of Formula I, a compound of Formula II, a compound of Formula III, a compound of Formula IV, a compound of Formula V or a compound of Formula VI:

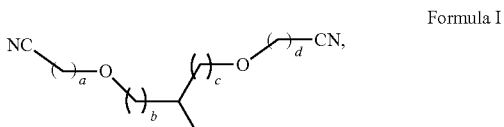

Formula I

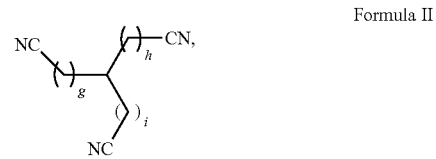

Formula II

Formula III

Formula IV

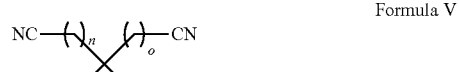

Formula V

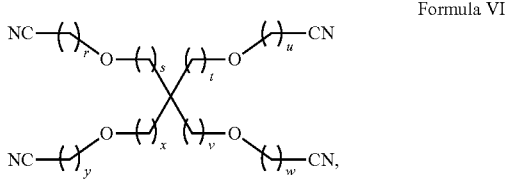

Formula VI wherein each of a, d, f, j, k, l, m, r, u, w and y is an integer independently selected from 1 to 5, and each of b, c, e, g, h, i, n, o, p, q, s, t, v and x is an integer independently selected from 0 to 5; and the mass percentage A % of the nitrile compound in the electrolyte is 0.1% to 10%.

In some embodiments, the nitrile compound includes at least one of the following compounds:

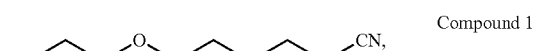

Compound 1

Compound 2

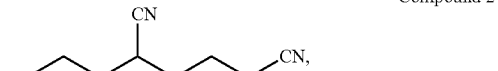

Compound 3

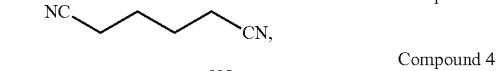

Compound 4

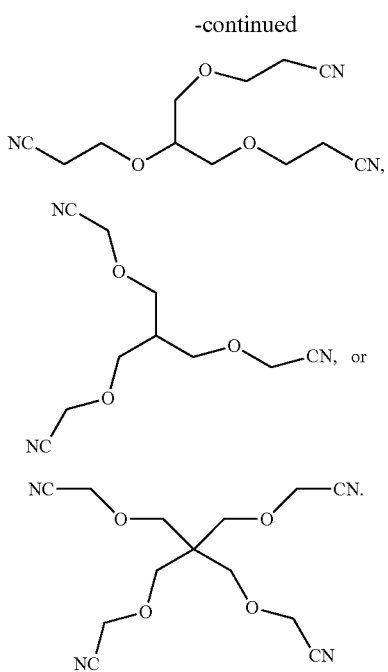

Compound 5

Compound 6

Compound 7

In some embodiments, the negative electrode includes a tab. The tab is formed through being connected to the second region by welding, and A×B<210.

In some embodiments, the negative electrode includes at least one tab, and the tab is formed by cutting the current collector. The tab includes a region not coated with a negative electrode active substance layer, and A×B<500.

In some embodiments, at least one of the second region is positioned at an edge of the current collector, a distance between the tab closest to the edge of the current collector and the edge of the current collector is C, and 0≤C/tab width≤50.

In some embodiments, at least one of the second region is positioned at the edge of the current collector, and an edge of the second region positioned at the edge of the current collector is either folded or not folded, wherein if the edge of the second region positioned at the edge of the current collector is folded, the width of the folded region is D, and 0.1≤D/tab width≤20.

In some embodiments, the current collector is a copper foil, and the copper foil has one or more of the following properties:
 a copper purity of ≥99.5%,
 a thickness of 3 microns to 15 microns,
 I a weight per unit area of 30 g/m² to 150 g/m²,
 a tensile strength of ≥20 kg/mm², and
 an elongation rate of ≥1.5%.

In some embodiments, the second region is optionally covered by a substance capable of being adhered onto the second region.

In some embodiments, a portion of the tab is optionally covered by a substance capable of being adhered onto the portion of the tab.

In some embodiments, the electrolyte further includes an additive. The additive includes at least one of the following: 1,3-propane sultone, fluoroethylene carbonate, vinylene carbonate, 2,4-butane sultone, 1,4-butane sultone, methylene methanedisulfonate, ethylene sulfate, succinic anhydride, ethoxy(pentafluoro)cyclotriphosphazene, 1,3-dioxane, or propenyl-1,3-sultone.

In some embodiments, the electrolyte further includes an anion, and the anion includes at least one of the following: $Cl^-$, $Br^-$, $SO_4^{2-}$, $CO_3^{2-}$ or $F^-$, and the content of the anion in the electrolyte is less than or equal to 1000 ppm.

In another aspect, the present application provides an electronic device, and the electronic device includes any of the electrochemical devices above.

Additional aspects and advantages of the embodiments of the present application will be described or shown in the following description or interpreted by implementing the embodiments of the present application.

DETAILED DESCRIPTION

Figure 1:
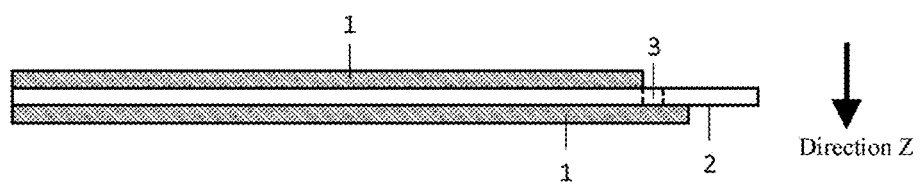
FIG. 1 is a top view of a current collector of a negative electrode according to an embodiment of the present application.

The embodiments of the present application will be described in detail below. The embodiments of the present application should not be interpreted as limitations to the protection scope of the present application. Unless otherwise expressly indicated, the following terms used herein have the meanings indicated below.

As used in the present application, terms "approximately", "substantially", "essentially", and "about" are used for describing and explaining a small variation. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%, and then it may be regarded that two values are "substantially" the same.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "at least one of" may mean any one of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" may mean any combination of the listed items. For example, if items A and B are listed, then the phrase "at least one of A and B" or "at least one of A or B" means only A; only B; or A and B. In another example, if items A, B and C are listed, then the phrases "at least one of A, B and C" or "at least one of A, B or C" mean only A; or only B; only C; A and B (excluding C); A and C (excluding B); B and C (excluding A); or all of A, B and C. The item A may include a single component or multiple components. The item B may include a single component or multiple components. The item C may include a single component or multiple components.

As used herein, the content of each ingredient in an electrolyte is obtained on the basis of the total weight of the electrolyte.

1. Electrolyte

In some embodiments, the electrolyte of the present application includes a nitrile compound, and the nitrile compound includes at least one of a compound shown as Formula I, a compound shown as Formula II, a compound shown as Formula III, a compound shown as Formula IV, a compound shown as Formula V or a compound shown as Formula VI:

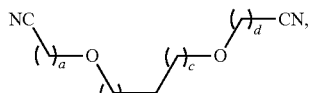

Formula I

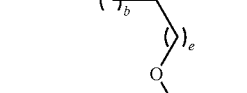

Formula II

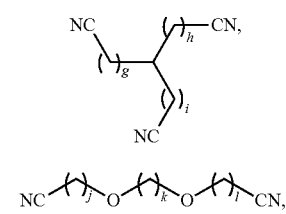

Formula III

Formula IV

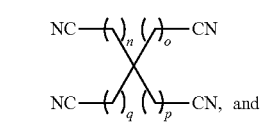

Formula V

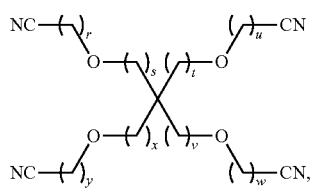

Formula VI wherein each of a, d, f, j, k, l, m, r, u, w and y is independently selected from 1, 2, 3, 4 or 5, and each of b, c, e, g, h, i, n, o, p, q, s, t, v and x is independently selected from 0, 1, 2, 3, 4 or 5; the mass percentage A % of the nitrile compound in the electrolyte is 0.1% to 10%, 0.3% to 8%, 1% to 6%, or 3% to 4%; and in some embodiments, A % is about 0.5%, about 1.5%, about 2.5%, about 3.5%, about 4.5%, about 5.5%, about 6.5%, about 7.5%, about 8.5% or about 9.5%.

In some embodiments, the nitrile compound includes at least one of the following compounds:

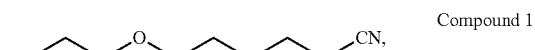

Compound 1

Compound 2

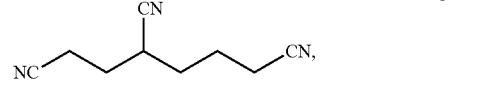

Compound 3

Compound 4

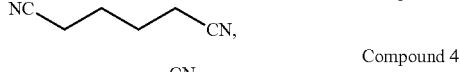

Compound 5

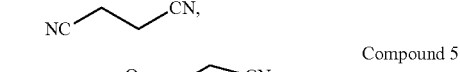

Compound 6

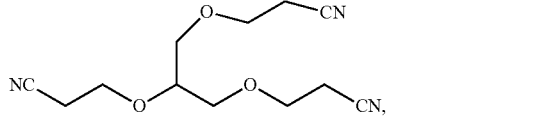

, or

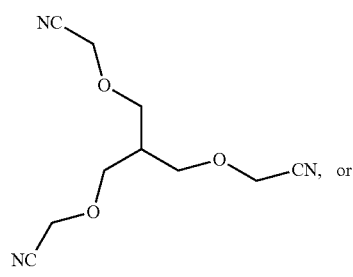

Compound 7

In some embodiments, in order to further improve performance of a lithium-ion battery, the electrolyte further includes one or more of the following additives: 1,3-propane sultone (PS), fluoroethylene carbonate (FEC), vinylene carbonate (VC), 2,4-butane sultone, 1,4-butane sultone, methylene methanedisulfonate (MMDS), ethylene sulfate (DTD), succinic anhydride (SA), ethoxy(pentafluoro)cyclotriphosphazene and 1,3-dioxane (DOX), or propenyl-1,3-sultone.

In some embodiments, in order to inhibit copper dissolution caused by the electrolyte containing the nitrile compound, the electrolyte may further contain an anion, such as at least one of the inorganic anions $Cl^-$, $Br^-$, $SO_4^{2-}$, $CO_3^{2-}$ or $F^-$. In some embodiments, the content of the anion in the electrolyte is less than or equal to 1000 ppm.

In some embodiments, the electrolyte further includes a lithium salt and an organic solvent.

In some embodiments, the lithium salt is one or more selected from inorganic lithium salts and organic lithium salts. In some embodiments, the lithium salt contains at least one of a fluorine element, a boron element or a phosphorus element. In some embodiments, the lithium salt is selected from one or more of the following lithium salts: at least one of lithium hexafluorophosphate ($LiPF_6$), bistrifluoromethanesulfonimide lithium salt (LiTFSI), lithium bis(fluorosulfonyl)imide (LIFSI), lithium bis(oxalate)borate (LiBOB), lithium difluoro(oxalato)borate (LiDFOB), lithium hexafluoroarsenate ($LiAsF_6$), lithium perchlorate ($LiClO_4$) and lithium trifluoromethanesulfonate ($LiCF_3SO_3$).

In some embodiments, the concentration of the lithium salt is 0.5 M to 1.5 M. In some embodiments, the concentration of the lithium salt is 0.8 M to 1.2 M.

The organic solvent includes a cyclic ester and a chain ester; the cyclic ester is at least one selected from ethylene carbonate (EC), propylene carbonate (PC), γ-butyrolactone (BL) and 2,3-butylene carbonate; and the chain ester is at least one selected from dimethyl carbonate (DMC), diethyl carbonate (DEC), ethyl methyl carbonate (EMC), propylene carbonate, methyl formate (MF), ethyl formate (EF), ethyl acetate (EA), ethyl propionate (EP), propyl propionate (PP), methyl propionate, propyl acetate, methyl butyrate and ethyl butyrate.

2. Electrochemical Device

The electrochemical device of the present application includes any device in which an electrochemical reaction occurs, and specific examples of the electrochemical device includes all kinds of primary batteries, secondary batteries, fuel cells, solar cells, or capacitors. Particularly, the electrochemical device is a lithium secondary battery including a lithium metal secondary battery, a lithium-ion secondary battery, a lithium polymer secondary battery or a lithium-ion polymer secondary battery. In some embodiments, the electrochemical device of the present application is an electrochemical device including a positive electrode with a positive electrode active substance capable of absorbing and releasing metal ions and a negative electrode with a negative electrode active substance capable of absorbing and releasing metal ions, and is characterized by including any of the above electrolytes of the present application.

Electrolyte

The electrolyte used in the electrochemical device of the present application is any of the above electrolytes of the present application.

Negative Electrode

In the electrochemical device according to the present application, the negative electrode includes a current collector and a negative electrode active material layer arranged on the current collector. The negative electrode active material layer includes a negative electrode active material. The specific type of the negative electrode active material is not particularly limited, and may be selected according to requirements.

The negative electrode may be prepared according to a preparation method known in the art. For example, the negative electrode may be obtained through the following method: mixing an active material, a conductive material and a binder in a solvent to prepare an active material composition, and applying the active material composition to the current collector.

The negative electrode active material includes a material for reversible intercalation/deintercalation of lithium ions. In some embodiments, the material for reversible intercalation/deintercalation of lithium ions includes a carbon material. In some embodiments, the carbon material may be any carbon-based negative electrode active material commonly used in lithium-ion rechargeable batteries. In some embodiments, the carbon material includes, but is not limited to, crystalline carbon, amorphous carbon, or a mixture thereof. The crystalline carbon may be amorphous, plate-shaped, platelet-shaped, spherical or fibrous natural graphite or artificial graphite. The amorphous carbon may be soft carbon, hard carbon, carbonized mesophase pitch, calcined coke, and the like.

In some embodiments, the negative electrode active material layer includes a negative electrode active material. In some embodiments, the negative electrode active material includes, but is not limited to, lithium metal, structured lithium metal, natural graphite, artificial graphite, mesocarbon microbead (MCMB), hard carbon, soft carbon, silicon, silicon-carbon composite, Li—Sn alloy, Li—Sn—O alloy, Sn, SnO, $SnO_2$, lithiated $TiO_2$—$Li_4Ti_5O_{12}$ of a spinel structure, Li—Al alloy or any combination thereof.

In some embodiments, the negative electrode active material layer may include a binder, and optionally includes a conductive material. The binder increases binding of negative electrode active material particles to each other and binding of the negative electrode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, an ethylene-oxide-containing polymer, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, nylon, etc.

In some embodiments, the conductive material includes, but is not limited to, a carbon-based material, a metal-based material, a conductive polymer or a mixture thereof. In some embodiments, the carbon-based material is selected from natural graphite, artificial graphite, carbon black, acetylene black, Ketjen black, carbon fiber or any combination thereof. In some embodiments, the metal-based material is selected from metal powder, metal fiber, copper, nickel, aluminum and silver. In some embodiments, the conductive polymer is a polyphenylene derivative.

The current collector of the negative electrode in the electrochemical device according to the present application may be selected from a copper foil, a nickel foil, a stainless steel foil, a titanium foil, nickel foam, copper foam, a polymer substrate coated with a conductive metal, and combinations thereof. In some embodiments, the current collector includes a copper foil.

In some embodiments, the copper foil is formed through electrolysis or calendaring. Its purity is greater than or equal to 99.5%, and the total content of trace elements such as nickel, zinc and chromium is less than or equal to 0.5 wt %.

In some embodiments, the copper foil has one or more of the following properties:
- a copper purity of ≥99.5%;
- a thickness of 3 microns to 15 microns, for example, the thickness is about 4 microns, about 5 microns, about 6 microns, about 7 microns, about 8 microns, about 9 microns, about 10 microns, about 11 microns, about 12 microns, about 13 microns, or about 14 microns;
- a weight per unit area of 30 g/m² to 150 g/m², for example, the weight in the unit area is about 50 g/m², about 70 g/m², about 90 g/m², about 110 g/m², or about 130 g/m²;
- a tensile strength of ≥20 kg/mm², for example, the tensile strength≥30 kg/mm², ≥40 kg/mm², or ≥50 kg/mm²; and
- an elongation rate of ≥1.5%, for example, the elongation rate ≥2%, ≥2.5%, ≥3%, ≥3.5%, or ≥4%.

In some embodiments, the copper foil is formed through electrolysis, its purity is greater than or equal to 99.5%, its thickness is about 6 microns, the tensile strength is greater than or equal to 30 kg/mm², and the elongation rate is greater than or equal to 3%.

In some embodiments, the copper foil has anti-corrosive properties, for example, no obvious color change occurs after the copper foil is soaked in an electrolyte prepared from ethylene carbonate (EC), propylene carbonate (PC) and diethyl carbonate (DEC) in a mass ratio of 3:1:7, and a LiPF$_6$ content being 1 mol/L at 45° C. for about 48 hours.

The electrochemical device in some embodiments includes a positive electrode, a negative electrode, a separator and an electrolyte, wherein the electrolyte includes a nitrile compound. The mass percentage of the nitrile compound in the electrolyte is A %. The negative electrode includes a current collector. The current collector includes a first region and a second region, wherein the first region is provided with a negative electrode active substance layer; the second region does not include a negative electrode active substance layer. The area of the second region accounts for B % of the surface area of the current collector, and the value of A times B is smaller than 600, for example, the value of A times B is smaller than 550, smaller than 500, smaller than 450, smaller than 400, smaller than 350, smaller than 300, smaller than 250, smaller than 200, smaller than 150, smaller than 100, smaller than 50, smaller than 30, smaller than 15, or smaller than 5.

In some embodiments, the negative electrode includes a tab. The tab is formed through being connected to the second region by welding, and the value of A times B is smaller than 210. For example, the value of A times B is smaller than 200, smaller than 150, smaller than 100, smaller than 50, smaller than 30, smaller than 15, or smaller than 10.

Figure 2:
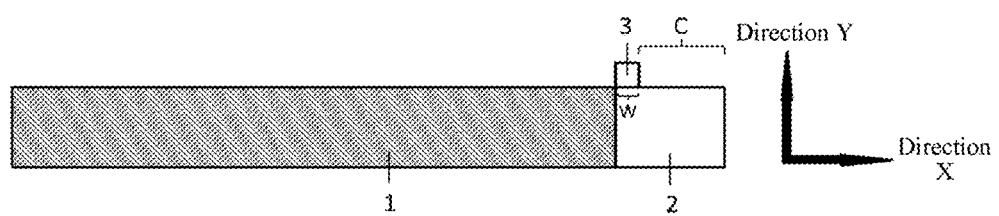
FIG. 2 is a side view of the current collector in FIG. 1 in direction Z.

FIG. 1 and FIG. 2 show schematic diagrams of a current collector of a negative electrode according to an embodiment of the present application. The current collector includes a first region 1 and a second region 2, wherein the first region is provided with a negative electrode active substance layer (as shown by gray region in the figure); and the second region does not include a negative electrode active substance layer. The negative electrode is provided with a tab 3, and the tab is formed by being connected to the second region through welding.

As shown in FIG. 2, in some embodiments, at least one second region is positioned at an edge of the current collector, wherein a distance between the tab closest to the edge of the current collector and the edge of the current collector is C, the width of the tab is W, and the range of "C/W" (i.e., the ratio of C to W) is 0 to 50, for example, 5 to 40, 10 to 30, 15 to 40, or 20 to 30.

In some embodiments, the negative electrode is provided with 1 to 150 tabs, for example, the number of the tabs is 3, 5, 7, 9, 10, 15, 20, 25, 30, 35, 40, 45, 50, 60, 70, 80, 90, 100, 110, 120, 130, or 140; the tabs are formed by cutting the current collector; the tabs include regions not coated with the negative electrode active substance layer; the value of A times B is smaller than about 500; and for example, the value of A times B is smaller than 450, smaller than 400, smaller than 350, smaller than 300, smaller than 250, smaller than 200, smaller than 150, smaller than 100, smaller than 50, smaller than 30, smaller than 15 or smaller than 10.

Figure 3:
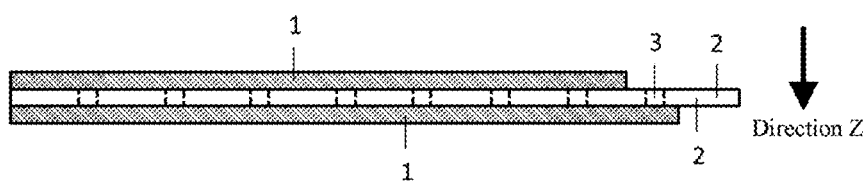
FIG. 3 is a top view of a current collector of a negative electrode according to another embodiment of the present application.
Figure 4:
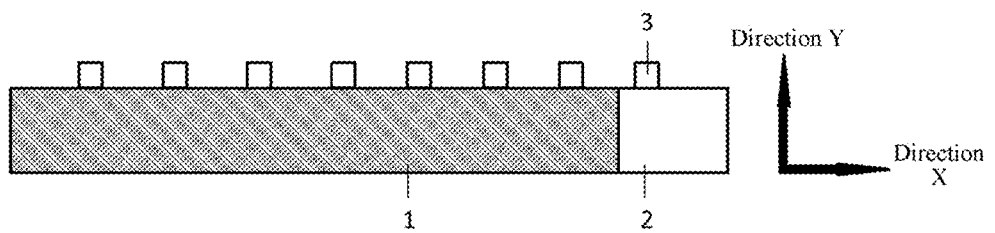
FIG. 4 is a side view of the current collector in FIG. 3 in direction Z.

FIG. 3 and FIG. 4 show schematic diagrams of a current collector of a negative electrode of another embodiment of the present application. The current collector includes a first region 1 and a second region 2, wherein the first region is provided with a negative electrode active substance layer; the second region does not include a negative electrode active substance layer. The negative electrode is provided with a plurality of tabs 3. The tabs are formed by cutting the current collector, and the tab includes a region not coated with the negative electrode active substance layer.

Figure 5:
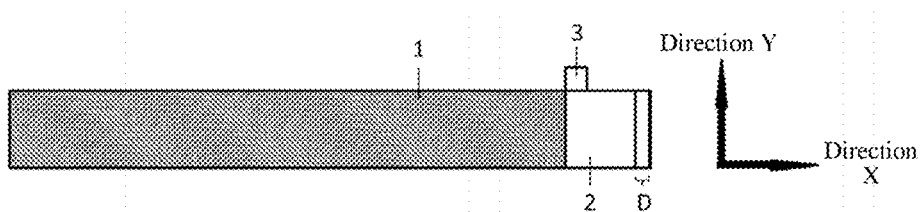
FIG. 5 is a side view of a current collector of a negative electrode according to another embodiment of the present application.

As shown in FIG. 5, in some embodiments, at least one second region is positioned at the edge of the current collector, and an edge of the second region positioned at the edge of the current collector is either folded or not folded. When the edge of the second region positioned at the edge of the current collector is folded, the width of the folded region is D, the width of the tab is W, and the range of "D/W" (i.e., the ratio of D to W) is 0.1 to 20, for example, 2 to 18, 4 to 16, 6 to 14, 8 to 12, or 9 to 10.

Figure 6:
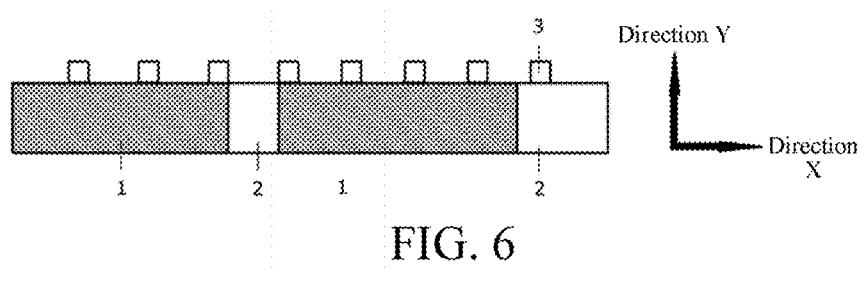
FIG. 6 is a side view of a current collector of a negative electrode according to another embodiment of the present application.

As shown in FIG. 6, in some embodiments, at least one second region is positioned at the edge of the current collector; and the negative electrode further includes one or more second regions positioned in the middle of the current collector, wherein the one or more second regions do not include a negative electrode active substance layer.

Figure 7:
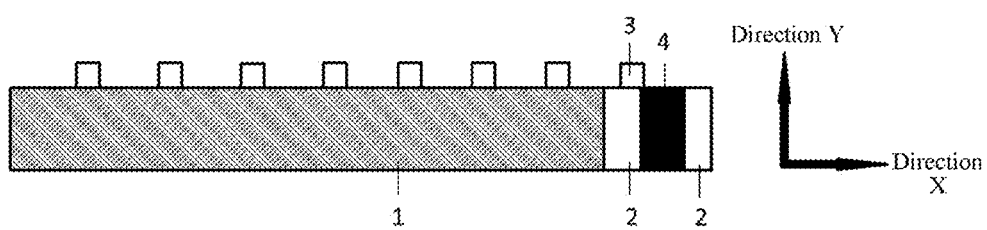
FIG. 7 is a side view of a current collector of a negative electrode according to another embodiment of the present application.

In some embodiments, in order to reduce the surface area of the second region as much as possible, the second region is optionally covered by a substance capable of being bond onto the second region. For example, as shown in FIG. 7, a part of the second region is covered by, for example but not limited to, a polymer adhesive tape 4.

Figure 8:
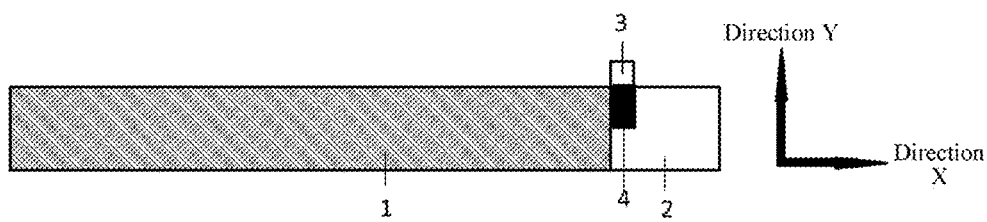
FIG. 8 is a top view of a current collector of a negative electrode according to another embodiment of the present application.

In some embodiments, a position of the tab is optionally covered by a substance capable of being adhered onto the position of the tab. For example, as shown in FIG. 8, in order to reduce copper ion dissolution in a welding position of the tab and the second region, the welding part of the tab may be covered by, for example but not limited to, a polymer adhesive tape.

In the negative electrode of the present application, the first region (i.e., the region provided with the negative electrode active substance layer) may be positioned on an upper surface, on a lower surface, or on both the upper and lower surfaces of the current collector of the negative electrode; the second region may be positioned at the edge and/or the inside of the current collector of the negative electrode; and the second region further includes a tab-welding position, a tab region formed through cutting, and an edge folded region.

Positive Electrode

A material of the positive electrode used in the electrochemical device of the present application may be prepared by using materials, structures, and manufacturing methods known in the art. In some embodiments, techniques recorded in U.S. Pat. No. 9,812,739B may be used for preparing the positive electrode of the present application, which is incorporated into the present application by reference in its entirety.

In some embodiments, the positive electrode includes a current collector and a positive electrode active material layer positioned on the current collector. A positive electrode active material includes at least one lithiated intercalation compound for reversible intercalation/deintercalation of lithium ions. In some embodiments, the positive electrode active material includes a composite oxide. In some embodiments, the composite oxide contains lithium and at least one element selected from cobalt, manganese and nickel.

In some embodiments, the positive electrode active material is selected from one or more of a lithium cobalt oxide, lithium manganate, a lithium nickel oxide or a lithium nickel manganese cobalt ternary material. The negative electrode active material contains silicon or silicon-oxygen materials, and may also be optionally selected from any of negative electrode materials capable of realizing deintercalation of lithium, such as graphite, hard carbon and mesocarbon microbeads.

In some embodiments, the positive electrode active material may be provided with a coating on the surface, or may be mixed with another compound with a coating. The coating may include at least one coating element compound selected from an oxide of a coating element, a hydroxide of the coating element, an oxyhydroxide of the coating element, an oxycarbonate of the coating element and a hydroxycarbonate of the coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combination thereof. The coating may be applied by any method as long as the method does not adversely affect the performance of the positive electrode active material. For example, the method may include any coating method known in the art, such as spray coating and dipping.

The positive electrode active material layer further includes a binder, and optionally includes a conductive material. The binder increases binding of positive electrode active material particles to each other and binding of the positive electrode active material and the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, an ethylene-oxide-containing polymer, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, nylon, etc.

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fiber or any combination thereof. In some embodiments, the metal-based material is selected from metal powder, metal fiber, copper, nickel, aluminum and silver. In some embodiments, the conductive polymer is a polyphenylene derivative.

In some embodiments, the current collector may be aluminum, but is not limited thereto.

The positive electrode may be prepared by a preparation method known in the art. For example, the positive electrode may be obtained by the following method: mixing the active material, the conductive material and the binder in a solvent to prepare an active material composition, and applying the active material composition to the current collector. In some embodiments, the solvent may include N-methylpyrrolidone and the like, but is not limited thereto.

In some embodiments, the positive electrode is prepared by forming a positive electrode material on the current collector by using a positive electrode active substance layer including lithium-transition metal compound powder and an adhesive.

In some embodiments, the positive electrode active substance layer may be generally prepared through the following operation: performing dry mixing on the positive electrode material and the adhesive (and a conductive material, a thickener, etc., used if needed) to form flakes, and pressing the obtained flakes on the current collector of the positive electrode; or dissolving or dispersing the materials in a liquid medium to form slurry, applying the slurry to the current collector of the positive electrode, and performing drying. In some embodiments, the material of the positive electrode active substance layer includes any material known in the art.

Separator

In some embodiments, the electrochemical device of the present application is provided with a separator between the positive electrode and the negative electrode to prevent short circuit. The material and shape of the separator used in the electrochemical device of the present application are not particularly limited, and may be any relevant techniques disclosed in the prior art. In some embodiments, the separator includes a polymer or an inorganic material and the like formed by a material stable in the electrolyte of the present application.

For example, the separator may include a substrate layer and a surface treatment layer. The substrate layer is a nonwoven fabric of a porous structure, a film or a composite film, and the material of the substrate layer is at least one selected from polyethylene, polypropylene, polyethylene terephthalate and polyimide. Specifically, a porous polypropylene film, a porous polyethylene film, a polypropylene nonwoven fabric, a polyethylene nonwoven fabric, or a porous polypropylene-polyethylene-polypropylene composite film may be selected and used. The substrate layer may be one layer or multiple layers. When the substrate layers are multiple layers, composition of polymers of different substrate layers may be identical or different, and weight-average molecular weights are different; and when the substrate layers are multiple layers, shutdown temperatures of the polymers of different substrate layers are different.

A surface treatment layer is arranged on at least one surface of the substrate layer, and the surface treatment layer may be a polymer layer or an inorganic material layer, or may be a layer formed by mixing a polymer and an inorganic material.

The inorganic material layer includes inorganic particles and an adhesive. The inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The adhesive is selected from one or a combination of several of polyvinylidene fluoride, vinylidene fluoride-hexafluoropropylene copolymers, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene. The polymer layer includes a polymer, and the material of the polymer includes at least one of polyamide, polyacrylonitrile, acrylate polymers, polyacrylic acid, polyacrylate, polyvinylpyrrolidone, polyvinyl ether, polyvinylidene fluoride or poly(vinylidene fluoride-hexafluoropropylene).

3. Application

The electrochemical device according to embodiments of the present application has improved cycle performance and high-temperature stability characteristics under an overdischarge condition, and is suitable to be used in various electronic devices.

The purpose of the electrochemical device of the present application is not particularly limited, and the electrochemical device can be used for various known purposes, for example, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk, a transceiver, an electronic notebook, a calculator, a memory card, a portable recorder, a radio, a backup power supply, a motor, a car, a motorcycle, a power bicycle, a bicycle, a lighting fixture, a toy, a game console, a clock, an electric tool, a flash lamp, a camera, a large household storage battery or a lithium-ion capacitor, etc.

EXAMPLES

Hereinafter, the present application will be specifically illustrated by way of examples and comparative examples. However, the present application is not limited thereto as long as they do not deviate from the spirit of the present application.

1. Preparation of Lithium-Ion Battery (1) Preparation of Negative Electrode
(i) Negative Electrode With Tab Formed by Welding
Artificial graphite powder, sodium carboxymethylcellulose (CMC) and styrene butadiene rubber were dissolved in water according to a mass ratio of 96:2:2 to obtain a negative electrode slurry through sufficient mixing and stirring; the negative electrode slurry was uniformly applied onto a specific region of a 12 micron-thick copper foil of a current collector of a negative electrode; baking was performed at 120° C. for 1 hour to obtain a negative electrode active material layer; and then, the negative electrode was obtained through compaction, splitting, and tab-welding.
(ii) Negative Electrode With Tab Formed by Cutting
Artificial graphite powder, sodium carboxymethylcellulose (CMC) and styrene butadiene rubber were dissolved in water according to a mass ratio of 96:2:2 to obtain a negative electrode slurry through sufficient mixing and stirring; the negative electrode slurry was uniformly applied onto a specific region of a 12 micron-thick copper foil of a current collector of a negative electrode; baking was performed at 120° C. for 1 hour to obtain a negative electrode active material layer; and then, the negative electrode was obtained through compaction, tab-cutting, and splitting.
(iii) Preparation Method of Negative Electrode (Example 59) With Polymer Adhesive Tape on Second Region of Negative Electrode
Artificial graphite powder, sodium carboxymethylcellulose (CMC) and styrene butadiene rubber were dissolved in water according to a mass ratio of 96:2:2 to obtain negative electrode slurry through sufficient mixing and stirring; the negative electrode slurry was uniformly applied onto a specific region of a 12 micron-thick copper foil of a current collector of a negative electrode; baking was performed at 120° C. for 1 hour to obtain a negative electrode active material layer; and then, the negative electrode was obtained through compaction, splitting, tab-welding, and sticking of a polymer adhesive tape made of acrylic ester onto a second region (i.e., the region not coated with the negative electrode slurry).
(iv) Preparation Method of Negative Electrode (Example 60) With Polymer Adhesive Tape at Welding Position of Tab
Artificial graphite powder, sodium carboxymethylcellulose (CMC) and styrene butadiene rubber were dissolved in water according to a mass ratio of 96:2:2 to obtain a negative electrode slurry through sufficient mixing and stirring; the negative electrode slurry was uniformly applied onto a specific region of a 12 micron-thick copper foil of a current collector of a negative electrode; baking was performed at 120° C. for 1 hour to obtain a negative electrode active material layer; and then, the negative electrode was obtained through compaction, splitting, tab-welding, and sticking of a polymer adhesive tape made of acrylic ester onto a welding region of a tab.
(2) Preparation of Positive Electrode
(i) Positive Electrode With Tab Formed by Welding
A positive electrode active material of lithium cobalt oxide (molecular formula: $LiCoO_2$), an adhesive of polyvinylidene fluoride (PVDF) and conductive graphite (Super-P) were dissolved in N-methylpyrrolidone (NMP) according to a mass ratio of 96:2:2 to obtain a positive electrode slurry through uniform mixing. The positive electrode slurry was uniformly applied onto an aluminum foil (having a thickness of about 12 micron) that acts as the current collector of the positive electrode. A positive electrode active material layer was obtained after baking at 120° C. for 1 hour, and then, the positive electrode was obtained through compaction, tab-welding and splitting.
(ii) Positive Electrode With Tab Formed by Cutting
A positive electrode active material of lithium cobalt oxide (molecular formula: $LiCoO_2$), an adhesive of polyvinylidene fluoride (PVDF) and conductive graphite (Super-P) were dissolved in N-methylpyrrolidone (NMP) according to a mass ratio of 96:2:2 to obtain a positive electrode slurry through uniform mixing. The positive electrode slurry was uniformly applied onto a 12 micron-thick aluminum foil that acts as the current collector of the positive electrode. A positive electrode active material layer was obtained after baking at 120° C. for 1 hour, and then, the positive electrode was obtained through compaction, tab-cutting and splitting.
(3) Preparation of Electrolyte
In a dry argon gas atmosphere glovebox, ethylene carbonate (EC), propylene carbonate (PC) and diethyl carbonate (DEC) were mixed according to a mass ratio of 3:1:7; $LiPF_6$ was added as a lithium salt, specific types and quantities of additives (the types and the quantities of added substances were shown in Table 1, and the content of each ingredient in the electrolyte was obtained on the basis of the total weight of the electrolyte) were added. The concentration of $LiPF_6$ in the electrolyte was about 1 mol/L.
(4) Preparation of Separator
A polypropylene separator having a thickness of about 12 microns was selected.
(5) Preparation of Lithium-Ion Battery
The positive electrode, the separator and the negative electrode were sequentially stacked, so that the separator was positioned between the positive electrode and the negative electrode to achieve an isolation effect. Then, the obtained structure was wound and charged into an aluminum foil packaging bag. After baking at 80° C. to remove water, a corresponding electrolyte was injected. Through work procedures of vacuum encapsulation, still standing, formation, shaping and the like, a lithium-ion battery was obtained.

2. Test on Copper Foil Used as Current Collector of Negative Electrode

Copper foil thickness test: An average value was taken after five points were measured by a micrometer.

Mass per unit area: The copper foil was cut into 100 mm×100 mm wide flakes and weighed, for calculating the mass per unit area. Mass per unit area=weight/area.

Tensile strength test: A tensile testing machine was used for testing. The length of a test sample was 200±0.5 mm, the width of the test sample was 15±0.25 mm, a tensile speed was set to be 50 mm/min, and the chuck distance of the testing machine was 125±0.1 mm. Five parallel samples were tested, and an average value was taken as a test result. During the test, the length direction of the test sample was parallel to the axial line of a clamp, the sample was maintained at a linear state, and an experiment temperature was 20±5° C.

Elongation rate test: A tensile testing machine was used for testing. The length of a test sample was 200±0.5 mm, the width of the test sample was 15±0.25 mm, a tensile speed was set to be 50 mm/min, the chuck distance of the testing machine was 125±0.1 mm. Five parallel samples were tested, and an average value thereof was taken as a test result. During the test, the length direction of the test sample was parallel to the axial line of a clamp, the sample was maintained at a linear state, and the experiment temperature was 20±5° C. Elongation rate=tensile length/original length.

3. Performance Test of Lithium-Ion Battery (1) Cycle Performance Test

A lithium-ion battery was charged to 4.45 V at a 1 C constant current under the condition of 45° C., stood for 30 minutes, and then discharged at 1 C to 3.0 V. The lithium-ion battery was cyclically charged and discharged for 500 times.

Capacity retention rate (%) of lithium-ion battery=discharge capacity after 500 cycles/initial discharge capacity×100%.

(2) 60° C. High-Temperature Storage Test

The lithium-ion battery was put into a 25° C. incubator, and was charged to 3.95 V at a 0.5 C constant current; and the thickness of the battery was tested. Then, the battery was fully charged to 4.45 V. The battery was put into a 60° C. oven and stored for 30 days. During this period, the thickness of the battery was tested every 3 days. If the thickness increase rate of the battery relative to that under the condition of 3.95 V is greater than 60%, the test was stopped.

Thickness increase rate=(thickness after storage−thickness under the condition of 3.95 V)/thickness under the condition of 3.95 V×100%.

(3) Floating Charging Leakage Current Test

The lithium-ion battery was stood for 120 minutes under the condition of 45° C., was charged to 4.45 V at 1 C, and was maintained at a constant-voltage charge state for 15 days. The magnitude of the current after the 15 days was recorded.

(4) Battery Extrusion Test

The lithium-ion battery was put into a 25° C. incubator, charged to 4.45 V at a 0.5 C constant current, and was then charged at a constant voltage to reach a 0.05 C current. Then, the battery was extruded by a 20 KN pressure, and whether combustion or explosion occurred to the battery was observed.

A. The electrolytes and the lithium-ion batteries in Examples 1-39 and Comparative Examples 1-6 were prepared according to the above methods, wherein the current collector of the negative electrode was a copper foil generated through electrolysis. The copper foil had a purity of ≥99.5%, a thickness of 6 microns, a tensile strength of ≥30 kg/mm$^2$, and an elongation rate of ≥3%. B % (i.e., the proportion of the area of a second region in the surface area of the negative electrode) was 18.2%, and the tab was connected to the second region by welding. The width W of the tab was 0.8 cm. The distance C between the tab and the edge of the current collector was 2 cm. The width D of an edge folded region of the second region located at the edge of the current collector was 1.8 cm. Tab of the positive electrode was correspondingly prepared by welding. The cycle capacity retention rate after certain cycles, the floating charging leakage current and the 60° C. high-temperature storage test of the lithium-ion batteries were tested. Test results are shown in Table 1.

TABLE 1

| | Nitrile compound | Mass percentage of nitrile compound in electrolyte A (%) | Proportion of area of second region in surface area of current collector B (%) | A × B | Capacity retention rate (%) | Floating charging leakage current (mA) | 60° C. high-temperature storage test (%) |
|---|---|---|---|---|---|---|---|
| Example 1 | Compound 1 | 0.3 | 18.2 | 5.46 | 70 | 4 | 48 |
| Example 2 | Compound 1 | 1 | 18.2 | 18.2 | 78 | 5 | 35 |
| Example 3 | Compound 1 | 3 | 18.2 | 54.6 | 75 | 7 | 15 |
| Example 4 | Compound 1 | 5 | 18.2 | 91 | 74 | 9 | 14 |
| Example 5 | Compound 1 | 10 | 18.2 | 182 | 67 | 20 | 14 |
| Example 6 | Compound 2 | 1 | 18.2 | 18.2 | 87 | 6 | 33 |

TABLE 1-continued

| | Nitrile compound | Mass percentage of nitrile compound in electrolyte A (%) | Proportion of area of second region in surface area of current collector B (%) | A × B | Capacity retention rate (%) | Floating charging leakage current (mA) | 60° C. high-temperature storage test (%) |
|---|---|---|---|---|---|---|---|
| Example 7 | Compound 2 | 3 | 18.2 | 54.6 | 86 | 8 | 15 |
| Example 8 | Compound 2 | 10 | 18.2 | 182 | 72 | 18 | 14 |
| Example 9 | Compound 3 | 0.3 | 18.2 | 5.46 | 72 | 4 | 47 |
| Example 10 | Compound 3 | 1 | 18.2 | 18.2 | 84 | 7 | 36 |
| Example 11 | Compound 3 | 3 | 18.2 | 54.6 | 79 | 9 | 18 |
| Example 12 | Compound 3 | 10 | 18.2 | 182 | 72 | 23 | 18 |
| Example 13 | Compound 5 | 0.3 | 18.2 | 5.46 | 70 | 3 | 50 |
| Example 14 | Compound 5 | 1 | 18.2 | 18.2 | 82 | 5 | 32 |
| Example 15 | Compound 5 | 3 | 18.2 | 54.6 | 81 | 6 | 13 |
| Example 16 | Compound 5 | 5 | 18.2 | 91 | 75 | 9 | 10 |
| Example 17 | Compound 5 | 10 | 18.2 | 182 | 70 | 19 | 10 |
| Example 18 | Compound 6 | 1 | 18.2 | 18.2 | 81 | 3 | 23 |
| Example 19 | Compound 6 | 3 | 18.2 | 54.6 | 81 | 4 | 14 |
| Example 20 | Compound 6 | 10 | 18.2 | 182 | 70 | 23 | 14 |
| Example 21 | Compound 7 | 0.3 | 18.2 | 5.46 | 70 | 3 | 51 |
| Example 22 | Compound 7 | 1 | 18.2 | 18.2 | 85 | 5 | 35 |
| Example 23 | Compound 7 | 3 | 18.2 | 54.6 | 83 | 6 | 13 |
| Example 24 | Compound 7 | 10 | 18.2 | 182 | 70 | 19 | 13 |
| Example 25 | Compound 1 + Compound 2 | 1.5 + 1.5 | 18.2 | 54.6 | 81 | 5 | 37 |
| Example 26 | Compound 1 + Compound 3 | 1.5 + 1.5 | 18.2 | 54.6 | 83 | 4 | 35 |
| Example 27 | Compound 1 + Compound 4 | 1.5 + 1.5 | 18.2 | 54.6 | 81 | 5 | 34 |
| Example 28 | Compound 1 + Compound 5 | 1.5 + 1.5 | 18.2 | 54.6 | 83 | 3 | 35 |
| Example 29 | Compound 1 + Compound 6 | 1.5 + 1.5 | 18.2 | 54.6 | 87 | 3 | 33 |
| Example 30 | Compound 1 + Compound 7 | 1.5 + 1.5 | 18.2 | 54.6 | 85 | 3 | 37 |
| Example 31 | Compound 2 + Compound 5 | 1.5 + 1.5 | 18.2 | 54.6 | 83 | 5 | 34 |
| Example 32 | Compound 2 + Compound 6 | 1.5 + 1.5 | 18.2 | 54.6 | 83 | 8 | 35 |
| Example 33 | Compound 2 + Compound 7 | 1.5 + 1.5 | 18.2 | 54.6 | 81 | 4 | 30 |
| Example 34 | Compound 3 + Compound 6 | 1.5 + 1.5 | 18.2 | 54.6 | 80 | 5 | 37 |
| Example 35 | Compound 3 + Compound 7 | 1.5 + 1.5 | 18.2 | 54.6 | 85 | 4 | 35 |
| Example 36 | Compound 1 + Compound 2 + Compound 3 | 1 + 1 + 1 | 18.2 | 54.6 | 81 | 3 | 35 |
| Example 37 | Compound 2 + Compound 4 + Compound 5 | 1 + 1 + 1 | 18.2 | 54.6 | 84 | 2.9 | 35 |
| Example 38 | Compound 3 + Compound 4 + Compound 6 | 1 + 1 + 1 | 18.2 | 54.6 | 84 | 4 | 36 |

TABLE 1-continued

| | Nitrile compound | Mass percentage of nitrile compound in electrolyte A (%) | Proportion of area of second region in surface area of current collector B (%) | A × B | Capacity retention rate (%) | Floating charging leakage current (mA) | 60° C. high-temperature storage test (%) |
|---|---|---|---|---|---|---|---|
| Example 39 | Compound 5 + Compound 6 + Compound 7 | 1 + 1 + 1 | 18.2 | 54.6 | 87 | 4 | 36 |
| Comparative example 1 | / | 0 | 18.2 | 0 | 61 | 2.5 | Test stopped due to serious gas expansion |
| Comparative example 2 | Compound 2 | 12 | 18.2 | 218.2 | 56 | 45 | 20 |
| Comparative example 3 | Compound 3 | 12 | 18.2 | 218.2 | 54 | 38 | 23 |
| Comparative example 4 | Compound 5 | 12 | 18.2 | 218.2 | 56 | 43 | 21 |
| Comparative example 5 | Compound 6 | 12 | 18.2 | 218.2 | 59 | 36 | 18 |
| Comparative example 6 | Compound 7 | 15 | 18.2 | 345 | 51 | 51 | 19 |

Note:
"/" represents absent.

Table 1 shows examples and comparative examples wherein B % (the proportion of the area of the second region in the surface area of the negative electrode) was fixed to be 18.2%. Compared with Comparative Example 1 wherein no nitrile compound was added to the electrolyte, Examples 1 to 39, in which a specific nitrile compound ranging from 0.1 wt % to 10 wt % was added into the electrolyte, show significantly improved cycle performance. From Comparative Examples 2 to 5 and Comparative Example 1, it can be seen that when increasing the content of the nitrile compound to 12 wt % so that the value of A times B reaches 218.2, the cycle performance was improved compared with that of Comparative Example 1, but the degree of improvement was reduced; and meanwhile, battery self-discharging was further improved. From Comparative Example 6, it can be seen that when increasing the content of the nitrile compound to 15% so as to make the product of A and B be greater than 210, the floating charging leakage current exceeded 50 mA, which seriously affected the function of the battery. Therefore, for conditions where the electrolyte contains 0.1 wt % to 10 wt % of the specific nitrile compound, when the tab and the second region is connected by welding, making the value of A times B be less than 210 can improve battery performance and meanwhile introduce small self-discharging. Addition of the nitrile compound can improve cycle performance because nitrile groups can complex with metal ions on the positive electrode and stabilize potential of the metal ions, thereby reducing phase changing of the structure of the positive electrode material. Meanwhile, the nitrile compound can adhere on the surface of the positive electrode to decrease contact between the positive electrode and the electrolyte. Due to a combination of the two effects, the cycle and floating charging performances of the battery can be significantly improved. However, the nitrile compound may cause a certain degree of dissolution of the copper foil current collector of the negative electrode. Particularly when a copper foil current collector with no active substance on its surface is exposed in the electrolyte, the dissolution of the copper foil caused by the nitrile compound is greatly enhanced. Dissolved copper ions can be slowly reduced into elemental copper and continuously deposited on the surface of the negative electrode during the charging and discharging process of the battery, which finally would cause a local short circuit and deteriorate the self-discharging of the battery. Although the nitrile compound may deteriorate self-discharging of a battery, it can improve electric performance of the battery. Therefore, it is necessary to add a certain content of nitrile compound into the electrolyte, and control the area of the exposed bare copper foil within a certain range, in order to control both the electric performance and self-discharging of the battery.

B. The electrolytes and the lithium-ion batteries in Examples 40 to 52 and Comparative Example 8 were prepared according to the above methods, wherein the current collector of the negative electrode was a copper foil generated through electrolysis. The copper foil had a purity of ≥99.8%, a thickness of 8 microns, a tensile strength of ≥30 kg/mm$^2$, and an elongation rate of ≥3%. The tab and the second region were connected by welding. The width W of the tab was 0.8 cm; the distance C between the tab and the edge of the current collectors was 2 cm; the width D of the edge folded region of the second region located at the edge of the current collector was 2.5 cm. The tab of the positive electrode was correspondingly prepared by welding. The cycle capacity retention rate after certain cycles, the floating charging leakage current and the 60° C. high-temperature storage test of the lithium-ion batteries were tested. The test results are shown in Table 2.

TABLE 2

| | Nitrile compound | Mass percentage of nitrile compound in electrolyte A (%) | Proportion of area of second region in surface area of current collector B (%) | A × B | Capacity retention rate (%) | Floating charging leakage current (mA) | 60° C. high-temperature storage test (%) |
|---|---|---|---|---|---|---|---|
| Example 40 | Compound 2 | 3 | 9.1 | 27.3 | 83 | 8 | 32 |
| Example 41 | Compound 3 | 3 | 17.6 | 52.8 | 88 | 8 | 32 |
| Example 42 | Compound 4 | 3 | 21.9 | 65.7 | 88 | 15 | 30 |
| Example 43 | Compound 5 | 3 | 23 | 69 | 86 | 16 | 35 |
| Example 44 | Compound 6 | 3 | 27 | 81 | 85 | 17 | 34 |
| Example 45 | Compound 7 | 3 | 31 | 93 | 81 | 11 | 34 |
| Example 46 | Compound 2 + Compound 3 | 1.5 + 1.5 | 17.6 | 52.8 | 81 | 6 | 37 |
| Example 47 | Compound 3 + Compound 4 | 1.5 + 1.5 | 17.6 | 52.8 | 81 | 3 | 34 |
| Example 48 | Compound 3 + Compound 5 | 1.5 + 1.5 | 21.9 | 65.7 | 81 | 6 | 36 |
| Example 49 | Compound 3 + Compound 5 + Compound 7 | 1 + 1 + 1 | 23 | 69 | 81 | 21 | 36 |
| Example 50 | Compound 2 + Compound 4 + Compound 5 | 1 + 1 + 1 | 23 | 69 | 81 | 23 | 35 |
| Example 51 | Compound 2 + Compound 4 + Compound 6 | 1 + 1 + 1 | 23 | 69 | 81 | 23 | 35 |
| Example 52 | Compound 2 | 3 | 0.4 | 1.2 | 82 | 0.6 | 35 |
| Comparative example 8 | Compound 2 | 3 | 85 | 255 | 70 | 47 | 37 |

Table 2 shows examples and comparative examples with the content of the nitrile compound in the electrolyte being 3 wt %. As shown in Examples 40 to 51, when the content of the nitrile compound in the electrolyte was fixed to 3 wt %, the cycle and storage performances of the batteries were good. With adjustment of the area of the second region of the negative electrode in the battery to increase the value of A times B, the floating charging leakage current of the batteries was increased. As shown in Comparative Example 8, when the value of A times B exceeds 210, serious self-discharging occurred, which affected and the function of the batteries. The current collector of the negative electrode in Example 52 did not include a second region (i.e., B is 0.4), so that the value of A times B is 1.2. Compared with Comparative Example 8, the battery of Example 52 achieved better cycle performance and smaller leakage current.

C. The electrolytes and the lithium-ion batteries in Examples 53 to 60 and Comparative Example 9 were prepared according to the above methods, wherein the current collector of the negative electrode was a copper foil generated through electrolysis. The copper foil had a purity of ≥99.8%, a thickness of 6 microns, a tensile strength of ≥30 kg/mm$^2$, and an elongation rate of ≥2%. The tab and the second region were connected through cutting; the number of the tabs was 9, the width W of the tab was 1.5 cm; the width D of the edge folded region of the second region positioned at the edge of the current collector was 1.5 cm. The tab of the positive electrode was correspondingly prepared by cutting. The cycle capacity retention rate after certain cycles, the floating charging leakage current and the 60° C. high-temperature storage test of the lithium-ion batteries were tested. The test results are shown in Table 3.

TABLE 3

| | Nitrile compound | Mass percentage of nitrile compound in electrolyte A (%) | Proportion of area of second region in surface area of current collector B (%) | A × B | Capacity retention rate (%) | Floating charging leakage current (mA) | 60° C. high-temperature storage test (%) |
|---|---|---|---|---|---|---|---|
| Example 53 | Compound 1 | 3 | 18.1 | 54.3 | 83 | 2 | 34 |

TABLE 3-continued

| | Nitrile compound | Mass percentage of nitrile compound in electrolyte A (%) | Proportion of area of second region in surface area of current collector B (%) | A × B | Capacity retention rate (%) | Floating charging leakage current (mA) | 60° C. high-temperature storage test (%) |
|---|---|---|---|---|---|---|---|
| Example 54 | Compound 2 | 3 | 22.5 | 67.5 | 85 | 3 | 28 |
| Example 55 | Compound 4 | 3 | 36.7 | 110.1 | 86 | 6 | 29 |
| Example 56 | Compound 5 | 3 | 54 | 162 | 83 | 21 | 32 |
| Example 57 | Compound 1 + Compound 2 | 1.5 + 1.5 | 18.1 | 54.3 | 84 | 4 | 33 |
| Example 58 | Compound 2 + Compound 4 | 1.5 + 1.5 | 18.1 | 54.3 | 81 | 3 | 33 |
| Example 59 | Compound 2 + Compound 4 + Compound 5 | 1.5 + 1.5 + 1.5 | 18.1 | 54.3 | 83 | 4 | 26 |
| Example 60 | Compound 2 | 3 | 2.3 | 6.9 | 83 | 0.2 | 31 |
| Comparative example 9 | Compound 5 | 12 | 54 | 648 | 80 | 40 | 15 |

As shown in Table 3, in Examples 53 to 60 and Comparative Example 9, the tabs of the batteries were all prepared by cutting. Examples 53 to 59 show that adjustment of B % (i.e, the proportion of the area of the second region) did not seem to significantly affect the capacity retention rate of the battery, but increased self-discharging of the battery. In Comparative Example 9 where A % (the mass percentage of the nitrile compound) was 12 wt % and B % (the proportion of the area of the second region) was 54% so that the value of A times B was 648, the self-discharging current reached 40 mA. The current collector of the negative electrode in Example 60 was completely coated with an active material, but no active material was applied to the tabs (i.e., B %=2.3%, which is the proportion of a bare copper foil at the positions of the tabs), so that the value of A times B is 6.9. Compared with Comparative Example 9, the battery of Example 60 achieved better cycle and storage performances and smaller leakage current. In view of the above, when preparing the tabs of the batteries by cutting, the value of A times B should be controlled within 600 to arrive at good battery performance.

D. The electrolytes and the lithium-ion batteries in Examples 61 to 63 were prepared according to the above methods, wherein the current collector of the negative electrode was a copper foil generated through electrolysis. The copper foil had a purity of ≥99.8%, a thickness of 6 microns, a tensile strength of ≥30 kg/mm², and an elongation rate of ≥2%. The tab and the second region were connected by welding. The width of the tab was 0.8 cm. The distance C between the tab and the edge of the current collector was 2 cm. The width D of the edge folded region of the second region positioned at the edge of the current collector was 1.8 cm. The tabs of the positive electrode were correspondingly prepared by welding. The cycle capacity retention rate after certain cycles, the floating charging leakage current and the 60° C. high-temperature storage test of the lithium-ion batteries were tested. The test results are shown in Table 4.

TABLE 4

| | Nitrile compound | Mass percentage of nitrile compound in electrolyte A (%) | A × B | Capacity retention rate (%) | Floating charging leakage current (mA) | 60° C. high-temperature storage test (%) |
|---|---|---|---|---|---|---|
| Example 61 | Compound 1 | 3 | 42 | 85 | 4 | 35 |
| Example 62 | Compound 1 | 3 | 75 | 84 | 8 | 34 |
| Example 63 | Compound 1 | 3 | 76.8 | 85 | 12 | 34 |

As shown in Table 4, in Example 61, the copper foil region not coated with the active substance layer was covered by a certain area of a polymer adhesive tape so as to reduce the contact area between the copper foil and the electrolyte. Compared with Example 63 which did not use the polymer adhesive tape, Example 61 achieved lower leakage current. In Example 62, the welding position of the tab was covered with a certain area of a polymer adhesive tape. Compared with Example 63 which did not use the polymer adhesive tape, the self-discharging of the battery of Example 62 was decreased. Therefore, in practical battery design, the welding position of the tab on the copper foil current collector of the negative electrode and other bare copper foil regions not coated with negative electrode active substances can be covered with a polymer adhesive tape or another substance capable of being bond onto the copper foil and tab, in order to reduce self-discharging of the battery.

E. The electrolytes and the lithium-ion batteries in Examples 64 to 70 were prepared according to the above methods, wherein the current collector of the negative electrode was a copper foil generated through electrolysis. The copper foil had a purity of ≥99.8%, a thickness of 6 microns, a tensile strength of ≥30 kg/mm², and an elongation rate of ≥2%. The tab and the second region were connected by welding; the width of the tab was 0.8 cm; the distance C between the tab and the edge of the current collector was 2 cm; and the width D of the edge folded region of the second region positioned at the edge of the current collectors was 1.8 cm. The tab of the positive electrode was correspondingly prepared by welding. The cycle capacity retention rate after certain cycles, the floating charging leakage current and the 60° C. high-temperature storage test of the lithium-ion batteries were tested. The test results are shown in Table 5.

TABLE 5

| | Nitrile compound | Mass percentage of nitrile compound in electrolyte A (%) | Other additives and mass percentage thereof in electrolyte (%) | A* B | Capacity retention rate (%) | Floating charging leakage current (mA) | 60° C. high-temperature storage test (%) |
|---|---|---|---|---|---|---|---|
| Example 64 | Compound 1 | 3 | PS 1 | 52.5 | 87% | 5 | 25 |
| Example 65 | Compound 2 | 3 | FEC + PS 1 + 1 | 52.5 | 84% | 3 | 23 |
| Example 66 | Compound 4 | 3 | PS + VC 1 + 0.5 | 52.5 | 86% | 2.4 | 17 |
| Example 67 | Compound 5 | 3 | DTD + SA 1 + 0.5 | 52.5 | 86% | 8 | 16 |
| Example 68 | Compound 2 | 3 | MMDS + VC 0.5 + 0.5 | 52.5 | 85% | 7 | 17 |
| Example 69 | Compound 4 | 3 | PS + VC + DTD 1 + 0.5 + 1 | 52.5 | 88% | 10 | 15 |
| Example 70 | Compound 1 | 3 | / | 52.5 | 75% | 11 | 36 |

Note:
"/" represents not added.

From Examples 64 to 69 and Example 70, it can be seen that addition of other additives in the electrolyte containing specific nitride compounds can significantly improve the cycle performance and floating charging thickness increase rate of batteries. The addition of FEC can increase the LiF content of the negative electrode SEI, and can improve stability of the negative electrode SEI. The addition of VC can facilitate the formation of a reticular protection layer at the surface layer of SEI through polymerization, and can increase flexibility of SEI. Addition of other additives can stabilize or strength the SEI protection layer to a certain degree. Therefore, the cycle performance of battery was improved. Meanwhile, due to a film forming effect of the additives on the negative electrode, deposition of copper ions on the negative electrode can be reduced to a certain degree, self-discharging of the battery can be reduced, which further improved the overall electric performance of the battery.

Therefore, it can be seen from the examples and the comparative examples that the nitrile compound as an effective additive for improving the cycle stability has great influence on the self-discharging of the battery. In order to improve the long-term storage performance of the battery, it is necessary to control the content of the nitrile compound and the area of the bare copper foil region within a certain range so as to ensure that the capacity of the battery would not be significantly reduced after long-term storage. Meanwhile, through addition of a certain content of other additives into the electrolyte, the cycle performance and self-discharging of the battery can be improved, and the long-term cycle and storage of the battery can be ensured.

F. The electrolytes and the lithium-ion batteries in Examples 71 to 72 were prepared according to the above methods, wherein the current collector of the negative electrode was a copper foil generated through electrolysis. The copper foil had a purity of ≥99.8%, a thickness of 6 microns, a tensile strength of ≥30 kg/mm$^2$, and an elongation rate of ≥2%. The tab and the second region were connected by welding. The width W of the tabs was 0.8 cm. The distance C between the tab and the edge of the current collectors was 2 cm. In Example 71, the width D of the edge folded region of the second region positioned at the edge of the current collector was 1.8 cm. In Example 72, the edge of the second region positioned at the edge of the current collector was not folded. The positive electrode tab was correspondingly prepared by welding. The cycle capacity retention rate after certain cycles, the floating charging leakage current and the 60° C. high-temperature storage test of the lithium-ion batteries were tested. The test results are shown in Table 6.

TABLE 6

| | Nitrile compound | Mass percentage of nitrile compound in electrolyte A (%) | A × B | Capacity retention rate (%) | Floating charging leakage current (mA) | Extrusion test |
|---|---|---|---|---|---|---|
| Example 71 | Compound 2 | 3 | 52.5 | 84% | 5 | No combustion occurred |
| Example 72 | Compound 2 | 3 | 52.5 | 83% | 6 | Combustion occurred |

As shown in Table 6, in Example 71, the edge of the second region positioned at the edge of the current collector was folded; and in Example 72 the edge of the second region positioned at the edge of the current collector was not folded. The capacity retention rates and the floating charging leakage current of Example 71 and Example 72 did not show obvious differences, but the extrusion test showed that the risk of piercing the separator by burrs in the welding position of the tab was reduced due to the folding, which made the battery achieve better safety performance.

G. The electrolytes and the lithium-ion batteries in Examples 73 to 76 were prepared according to the above methods, wherein the current collector of the negative electrode was a copper foil generated through electrolysis. The copper foil had a purity of ≥99.8%, a thickness of 6 microns, a tensile strength of ≥30 kg/mm$^2$, and an elongation rate of ≥2%. The tab and the second region were connected by welding. The width W of the tab was 0.8 cm. The distance C between the tab and the edge of the current collector was 2 cm. The width D of the edge folded region of the second region positioned at the edge of the current collector was 1.8 cm. The tab of the positive electrode was correspondingly prepared by welding. The cycle capacity retention rate after certain cycles, the floating charging leakage current and the 60° C. high-temperature storage test of the lithium-ion batteries were tested. The test results are shown in Table 7.

TABLE 7

| | Nitrile compound | Mass percentage of nitrile compound in electrolyte A (%) | A × B | Cl$^-$ content (ppm) | Capacity retention rate (%) | Floating charging leakage current (mA) |
|---|---|---|---|---|---|---|
| Example 73 | Compound 5 | 3 | 36.9% | 100 | 81% | 7 |
| Example 74 | Compound 5 | 3 | 36.9% | 500 | 82% | 6 |
| Example 75 | Compound 5 | 3 | 36.9% | 1000 | 80% | 5 |
| Example 76 | Compound 5 | 3 | 36.9% | 1100 | 75% | 4 |

As shown in Table 7, addition of a proper amount of an anion (e.g., Cl$^-$) in the electrolyte can improve leakage current of the battery. However, high amount of the anion (e.g., exceeding 1000 ppm) would greatly affect the capacity retention rate of the battery. Therefore, while ensuring the electric performance of the battery, a proper amount of the anion may be added into the electrolyte to improve the floating charging leakage current.

The foregoing descriptions are merely a few embodiments of the present application and are not intended to limit the present application in any manner. Although the present application is described with reference to preferred embodiments, the embodiments are not intended to limit the present application.

Throughout the specification, references to "embodiment," "part of embodiments," "one embodiment," "another example," "example," "specific example" or "part of examples" mean that at least one example or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising: a positive electrode, a negative electrode, a separator, and an electrolyte; wherein
the electrolyte comprises a nitrile compound, wherein the nitrile compound comprises at least one of:

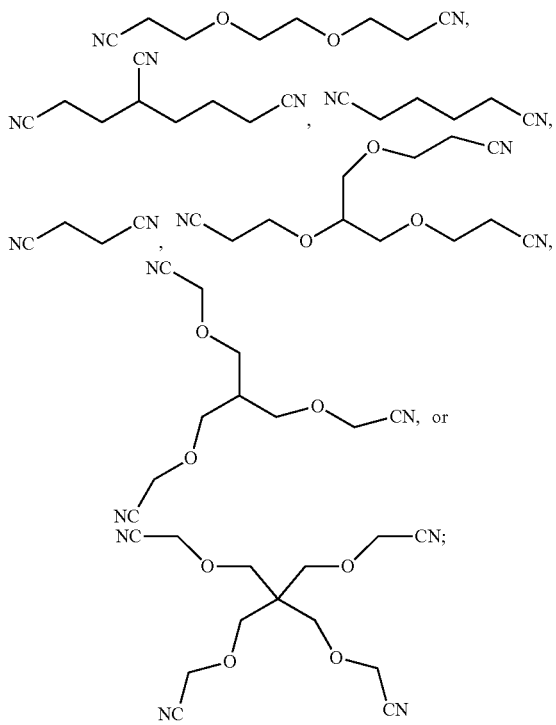

and a mass percentage of the nitrile compound in the electrolyte, A %, is 0.1% to 10%;
the negative electrode comprises a current collector, wherein the current collector comprises a first region and a second region;
a negative electrode active substance layer is provided only in the first region;
an area of the second region, B %, is 0.4% to 54% of a surface area of the current collector; and
A×B<600.

2. The electrochemical device according to claim 1, wherein the nitrile compound comprises at least one of a compound of Formula I, a compound of Formula II, a compound of Formula III, a compound of Formula IV, a compound of Formula V or a compound of Formula VI:

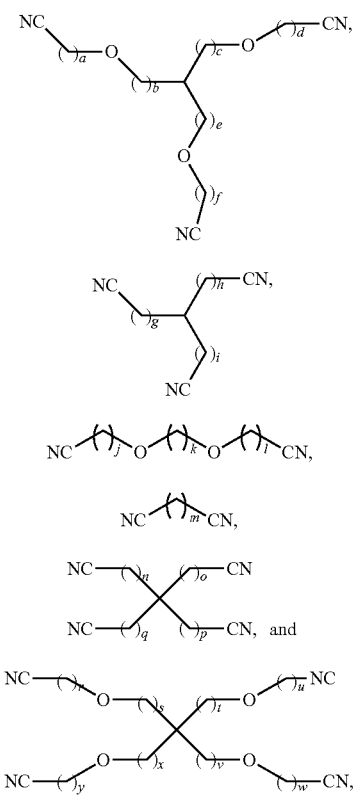

Formula I

Formula II

Formula III

Formula IV

Formula V

Formula VI wherein each of a, d, f, j, k, l, m, r, u, w and y is an integer independently selected from 1 to 5, and each of b, c, e, g, h, i, n, o, p, q, s, t, v and x is an integer independently selected from 0 to 5.

3. The electrochemical device according to claim 1, wherein the negative electrode comprises at least one tab, the tab is formed by being connected to the second region through welding, and A×B<210.

4. The electrochemical device according to claim 1, wherein the negative electrode comprises at least one tab, the tab is formed by cutting the current collector, the tab comprises a region not coated with the negative electrode active substance layer, and A×B<500.

5. The electrochemical device according to claim 3, wherein at least one of the second region is positioned at an edge of the current collector, wherein a distance between a first tab from the at least one tab closest to an edge of the current collector and the edge of the current collector is C, and 0≤C/tab width≤50.

6. The electrochemical device according to claim 4, wherein at least one of the second region is positioned at an edge of the current collector, wherein a distance between a first tab from the at least one tab closest to the edge of the current collector and the edge of the current collector is C, and 0≤C/tab width≤50.

7. The electrochemical device according to claim 1, wherein at least one of the second region is positioned at the edge of the current collector, and an edge of the second region positioned at the edge of the current collector is either folded or not folded, wherein when the edge of the second region positioned at the edge of the current collector is folded, a width of the folded region is D, and 0.1≤D/tab width≤20.

8. The electrochemical device according to claim 1, wherein the current collector is a copper foil and the copper foil has one or more of the following properties:
 a copper purity of ≥99.5%,
 a thickness of 3 microns to 15 microns,
 a weight per unit area of 30 g/m² to 150 g/m²,
 a tensile strength of >20 kg/mm², and
 an elongation rate of ≥1.5%.

9. The electrochemical device according to claim 1, wherein the second region is covered by a substance adhered onto the second region.

10. The electrochemical device according to claim 3, wherein a position of the at least one tab is covered by a substance bond onto the position of the tab.

11. The electrochemical device according to claim 4, wherein a position of the at least one tab is covered by a substance bond onto the position of the tab.

12. The electrochemical device according to claim 1, wherein the electrolyte further comprises an additive, and the additive comprises at least one of the following: 1,3-propane sultone, fluoroethylene carbonate, vinylene carbonate, 2,4-butane sultone, 1,4-butane sultone, methylene methanedisulfonate, ethylene sulfate, succinic anhydride, ethoxy (pentafluoro)cyclotriphosphazene, 1,3-dioxane, or propenyl-1,3-sultone.

13. The electrochemical device according to claim 1, wherein the electrolyte further comprises an anion, the anion comprises at least one of Cl⁻, Br⁻, $SO_4^{2-}$, $CO_3^{2-}$ or F, and the content of the anion in the electrolyte is less than or equal to 1000 ppm.

14. An electronic device, comprising an electrochemical device, wherein the electrochemical device comprises a positive electrode, a negative electrode, a separator, and an electrolyte; wherein
 the electrolyte comprises a nitrile compound, and a mass percentage of the nitrile compound in the electrolyte, A %, is 0.1% to 10%;
 the negative electrode comprises a current collector, wherein the current collector comprises a first region and a second region;
 a negative electrode active substance layer is provided only in the first region;
 an area of the second region, B %, is 0.4% to 54% of a surface area of the current collector; and
 A×B<600.

15. The electronic device according to claim 14, wherein the nitrile compound comprises at least one of a compound of Formula I, a compound of Formula II, a compound of Formula III, a compound of Formula IV, a compound of Formula V or a compound of Formula VI:

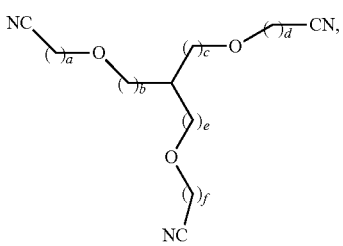

Formula I

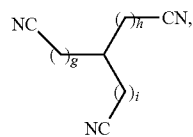

Formula II

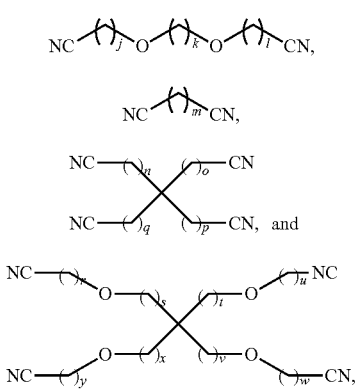

Formula III

Formula IV

Formula V

Formula VI wherein each of a, d, f, j, k, l, m, r, u, w and y is an integer independently selected from 1 to 5, and each of b, c, e, g, h, i, n, o, p, q, s, t, v and x is an integer independently selected from 0 to 5.

16. The electrochemical device according to claim 14, wherein the nitrile compound comprises at least one of:

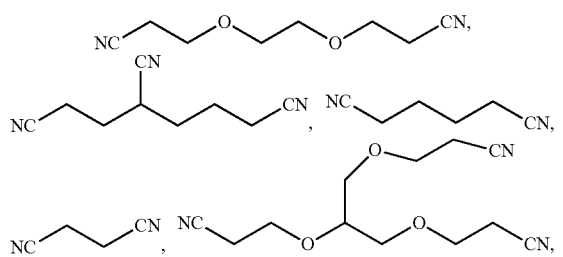

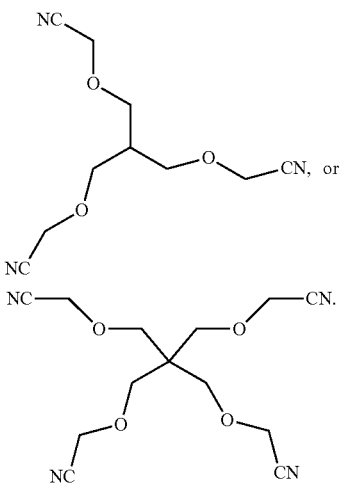

17. The electrochemical device according to claim 14, wherein the negative electrode comprises a tab, the tab is formed by being connected to the second region through welding, and A×B<210.

18. The electrochemical device according to claim 14, wherein the negative electrode comprises at least one tab, the tab is formed by cutting the current collector, the tab comprises a region not coated with the negative electrode active substance layer, and A×B<500.

19. The electrochemical device according to claim 14, wherein the second region is covered by a substance adhered onto the second region.

\* \* \* \* \*